Patented Dec. 29, 1942

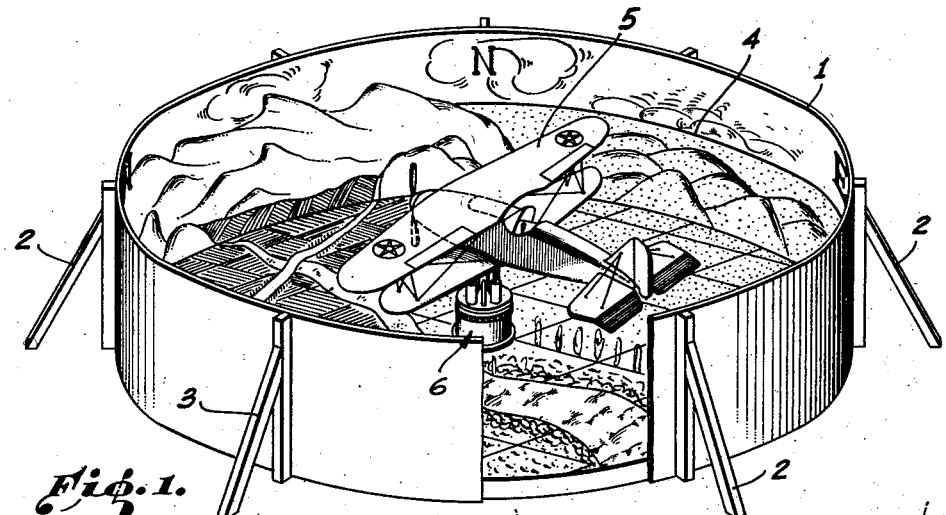
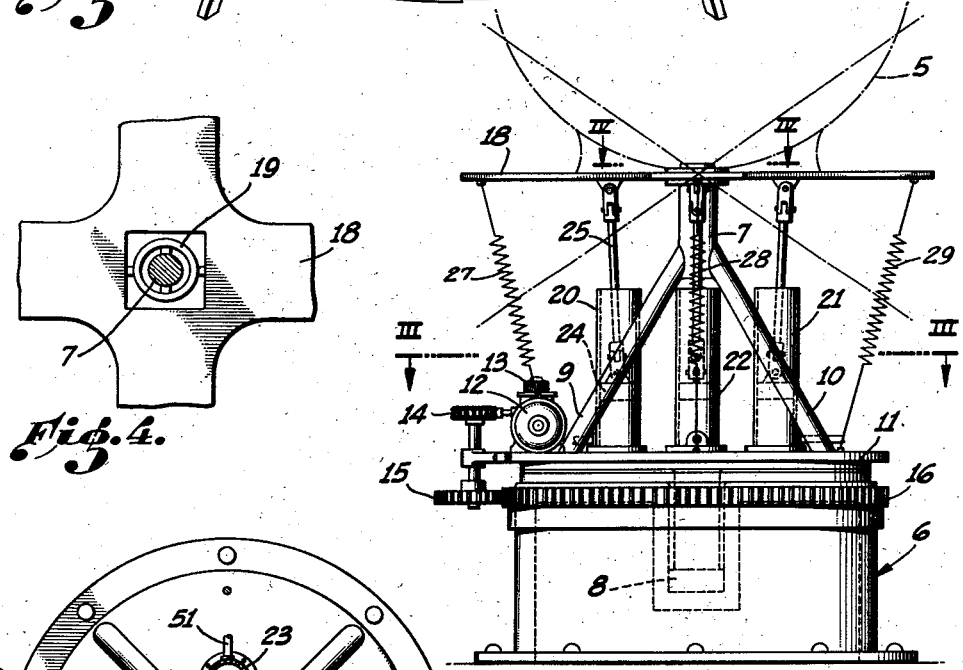
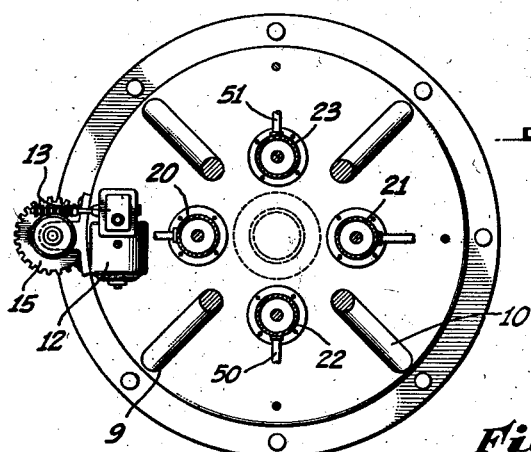
Dec. 29, 1942. A. EDWARDS 2,306,429
DEVICE FOR INSTRUCTING STUDENTS IN FLYING
Filed Dec. 23, 1941 2 Sheets-Sheet 1
ALAN EDWARDS, INVENTOR

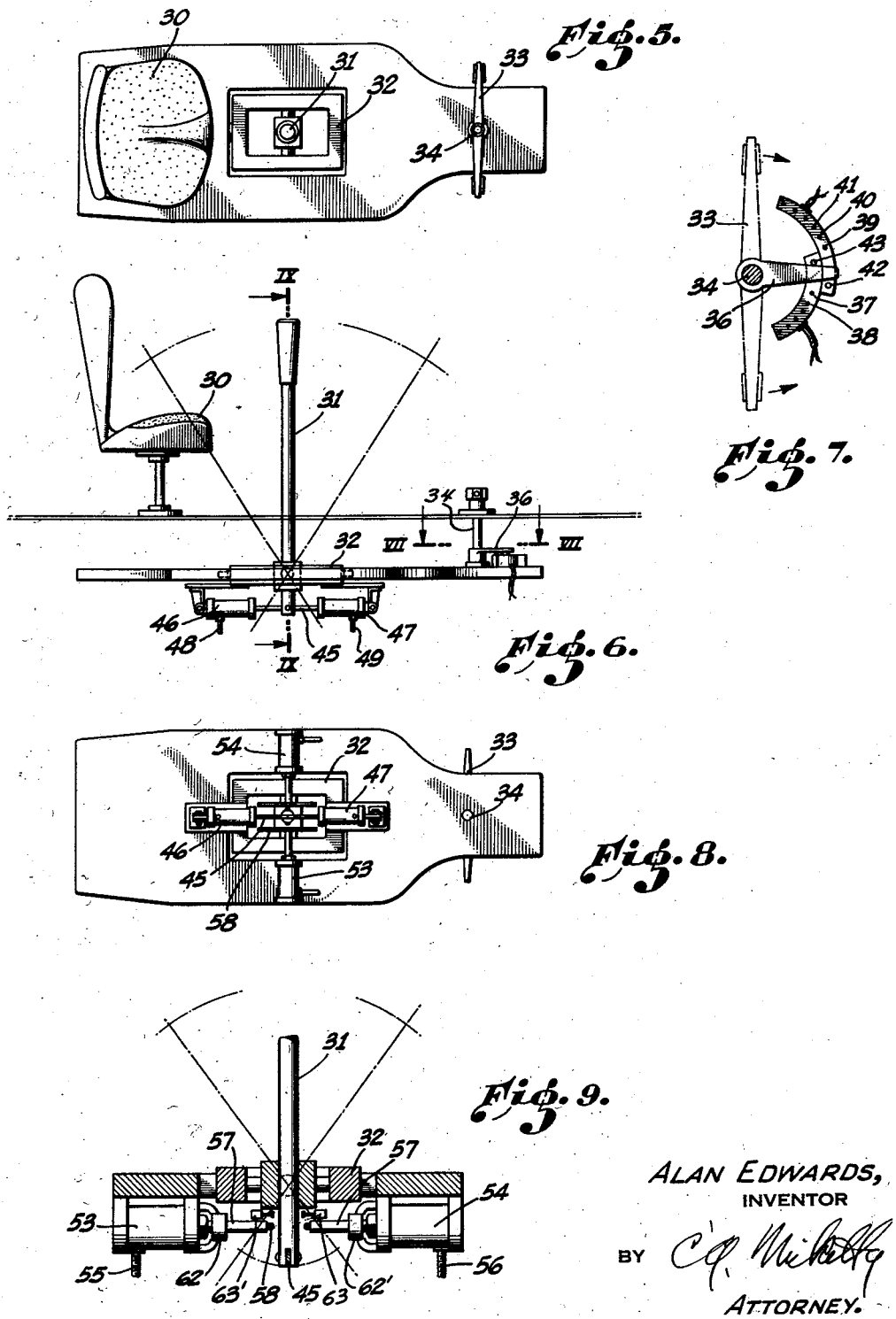

2,306,429

UNITED STATES PATENT OFFICE 2,306,429

DEVICE FOR INSTRUCTING STUDENTS IN FLYING

Alan Edwards, Los Angeles, Calif.

Application December 23, 1941, Serial No. 424,098

4 Claims. (Cl. 35—12)

The present invention relates to an apparatus particularly adapted to instruct students in the art of flying an airplane and the device is designed to duplicate on the ground many of the movements encountered in the actual flight of an airplane and create the impression of flying in a realistic manner, thereby causing the student to experience many of the same effects as he would obtain in flight and thereby permit the student to learn coordination and automatic response without depending wholly upon the indications of instruments.

Generally stated, the invention pertains to an arrangement of elements including a substantially circular stationary enclosure provided on its inner surface with a pictorial representation simulating a panorama of the character visible from a height and including a continuous horizon together with an airplane in the center of said enclosure, said airplane being supported by a rotatable base whereby the plane may be caused to perform complete turns. The student in the airplane is provided with the customary control stick and rudder and means responsive to the manipulation of the stick and rudder are provided for moving the control surfaces of the airplane as in flight. Additional means are provided whereby the airplane may be tilted upon longitudinal and transverse axes and actually turned into positions simulating actual flight with respect to the stationary panorama, in response to the movement of the stick and rudder.

In this manner, many of the positions assumed by an airplane in actual flight may be duplicated within the enclosure, the stationary cyclorama or panorama with its horizon permitting the student to use such horizon as a reference point to which he may return the airplane in order to assume a certain direction of flight, level flight, or the like.

It is an object of the present invention, therefore, to disclose and provide means whereby student pilots may be instructed in the art of flying airplanes without leaving the ground.

A further object of the invention is to disclose and provide a combination of a stationary panorama and an airplane movable in response to the controls of the student pilot in such airplane, whereby all of the sensations of actual flight may be readily duplicated.

A further object of the invention is to disclose and provide means whereby the student pilot may be subjected to rough air flying conditions so as to familiarize the student with conditions which he may encounter in actual flight.

These and other objects, uses and advantages of the present invention will become apparent to those skilled in the art from the following detailed description of one exemplary form that this invention may assume.

In the drawings:

Fig. 1 is a perspective of the device embraced by the present invention.

Fig. 2 is an enlarged side elevation of a mount means upon which the airplane may be carried.

Fig. 3 is a horizontal section taken approximately along the plane III—III of Fig. 2.

Fig. 4 is an enlarged section taken along the plane IV—IV of Fig. 2.

Fig. 5 is a plan view of a portion of the airplane mounted upon the base shown in Fig. 2, this figure showing the location of the seat, rudder and stick.

Fig. 6 is a side elevation of the controls.

Fig. 7 is an enlarged horizontal section taken along the plane VII—VII of Fig. 6.

Fig. 8 is a bottom view of Fig. 6.

Fig. 9 is a transverse view, partly in section, taken along the plane IX—IX of Fig. 6.

The general arrangement to which this invention is directed is shown in Fig. 1 wherein a circular enclosure is indicated at 1, this enclosure being suitably supported externally by posts or pillars 2, 3 and the like. In actual practice, the circular enclosure 1 is provided on its interior surface with a cyclorama or panorama which may be either painted on the inner surface of the enclosure or which may be obtained by the use of enlarged photographic reproductions suitably attached to the inner surface. Such panorama is preferably of the character which would actually be visible to a pilot of a plane from an altitude of say 1500 or 2000 feet and should include a horizon, as indicated at 4, this horizon extending completely around the enclosure. The floor or base of the enclosure, shown in the drawings, is flat and is either painted or otherwise equipped with a bird's-eye view of the country over which the pilot is presumed to be flying. The enclosure will obviously be provided with a suitable doorway through which the student or instructor may enter to assume his place in an airplane 5 which is positioned in the center of the enclosure upon a suitable base or pedestal 6.

The airplane 5 may be provided with dual controls as in most training ships and the two controls may be interlocked but it is highly essential that the student and his control stick be capable of imparting movement to the airplane 5 upon the pedestal 6. The drawings, in order to simplify explanation, show only one set of controls.

As shown in greater detail in Figs. 2, 3 and 4, the base 6 may be provided with a vertical post 7 journaled for rotation within the base 6 and extending into a suitable well, such as that indicated at 8, formed in the base 6, suitable thrust bearings being introduced between the bottom of the well and the bottom of the post 7. The post 7 may be provided with a plurality of angularly inclined braces such as 9, 10 and the like, extending from the center post 7 to a rotatable plate 11. Suitable wheels or bearings may be provided between the bottom of the rotatable plate 11 and the top of the base 6 so as to assure ready and steady movement of the base and post 7 upon the base 6. Rotation of the entire assembly may be controlled by a suitable reversible motor 12 carried by the rotatable plate 11, gearing 13 and a worm and wheel drive 14 by means of which a spur gear 15 may be driven, this gear engaging a stationary spur gear 16 carried by the upper portion of the base 6. The motor 12 is preferably a reversible variable speed motor.

Mounted upon the top of the center post 7 is a cross 18 which is connected to the top of post 7 by means of a universal joint as, for example, through the medium of a gimbal ring generally indicated at 19.

Mounted upon the rotatable plate 11 are four cylinders 20, 21, 22 and 23, the cylinders 20 and 21 controlling movement of the plane around a longitudinal axis whereas the cylinders 22 and 23 control movement of the plane about a transverse axis. Each of the cylinders contains a piston such as the piston 24 connected by flexible universal couplings with a piston rod 25, such piston rod being then connected by a flexible coupling to an arm of the cross 18. It will be evident to any one skilled in the art that in the event fluid pressure is increased in cylinder 20 and decreased in cylinder 21, the airplane attached to the cross 18 will pivot about a longitudinal axis and tilt towards the right. The cross 18 and the airplane carried thereby tend to assume a normal flight level position by reason of springs, such as the springs 27, 28 and 29 extending between the cross arms 18 and the rotatable plate 11, these springs being provided with snubbers to prevent unnecessarily rapid action.

A diagrammatic representation of the student pilot's seat and of the controls correlated therewith is shown in Figs. 5 to 9 inclusive, it being understood that this seat and controls are carried by the airplane 5. The seat is indicated at 30 and is preferably of a type adapted to maintain the occupant firmly in position so as to prevent the student from sliding thereon in the event the airplane goes into a bank. The control stick 31 is capable of universal movement and for purposes of simplicity is shown mounted in a gimbal 32. The rudder control is indicated in simplified form as consisting of a rudder bar 33 pivoted at 34.

Movement of the rudder bar 33 causes movement of the actual rudder of the airplane 5 by means of cable controls of the conventional type. The shaft 34 to which the rudder bar 33 is attached, may be provided with a contact arm 36 adapted to move over a series of push and rock type of two point make and break switches, indicated at 37, 38, etc. on one side and over a similar series of similar switches 39, 40, etc., on the other side of the longitudinal center line passing through the pivot pin 34. It is necessary to move the rudder bar 33 through an angle of slightly more than 5° before causing the arm 36 to depress the first switch button of a series. Various resistances are introduced between the progressive contact buttons so that when the right rudder is depressed so as to cause contact arm to depress and close switch 39, the motor 12 is energized and being a variable speed motor, runs but slowly. If, however, the right rudder is depressed further so as to close say contact 40 or 41, then the motor 12 rotates in the same direction but at a more rapid rate. After closing contact switches 39, 40 and 41, the rudder bar may be returned to normal position and the contacts 39, 40 and 41 will remain closed, thereby duplicating the action which takes place in an airplane in actual flight, namely, the airplane will continue to turn in the direction initiated by the movement of the rudders until a positive movement in the opposite direction is imparted to the rudder bar. If, therefore, after closing contacts 39, 40 and 41 the student returns the rudder bar 33 to its normal position, the plane will continue to turn and such turning movement of the airplane will be readily visible to the student inasmuch as the plane will actually turn within the enclosure 1 and the student will see the horizon and the panorama depicted on the inner surface of the enclosure 1 moving before him. In order to stop the turning movement, he will have to depress the left portion of the rudder very slightly, for instance, less than about 7°, thereby moving the unlocking button 42 which causes all of the contact switches 39, 40 and 41 to open, discontinuing the supply of energy to the motor 12. Unlocking button 43 controls the contacts 37, 38 and the like on the other side of the longitudinal axis of the plane.

Movement of the plane about a transverse axis is ordinarily obtained by moving the control stick 31 either forward or aft in a plane passing through the longitudinal axis of the airplane and such movement of the control stick causes movement of the elevator surfaces in the tail assembly. The control stick 31 is also connected to piston rods 45 extending into pressure cylinders 46 and 47, the piston rod 45 being connected to a piston in each of the cylinders 46 and 47. These pistons are provided with pressure fluid and are connected as by lines 48 and 49 respectively to the inlet pipes 50 and 51 respectively leading to the lower portions of cylinders 22 and 23. Movement of the stick 31 towards the nose of the plane will therefore increase the pressure in piston 46, which pressure is transmitted by line 48 to cylinder 22, thereby causing the tail of the plane to be elevated and the nose to drop. The angle of climb or of descent may therefore be readily controlled by the extent of the fore or aft movement of the control stick 31 and as soon as the stick is returned to its neutral position, the plane will assume a horizontal position.

In banking, however, the stick 31 is moved either to the left or to the right, that is, it is moved about a longitudinal axis. In performing a bank in actual flight, when the stick is first moved to the left to depress the left wing and then the stick is returned to neutral position, the plane will remain in its depressed wing position until such time as the pilot positively corrects the angle of the ailerons by a slight movement to the right, followed by a return to neutral position. These actual flying conditions are duplicated by the controls of the airplane 5 by any suitable mechanical means for controlling the admission of and release of pressure in the cylinders 20 and 21. A simple form of such means is illustrated in Fig. 9, wherein the booster pressure cylinders 53 and 54 are connected by lines 55 and 56 respectively to the lower portions of cylinders 20 and 21. Each booster cylinder 53 and 54 contains a piston operably associated with a rod, such as the rod 57, the outer end of such piston rod being provided with a longitudinally extending contact bar 58 adapted to engage the control stick 31 whenever the top of the control stick is moved to the right, irrespective of the fore and aft angular position of the stick 31. For example, the piston rod 57 may pass through a releasable clamping device 62 attached to the booster cylinder 53, the releasable clamping device 62 being adapted to hold the piston rod 57 in whatever position it has been placed by movement of the control stick 31. If, therefore, the stick 31 has been moved to the right (Fig. 9), the piston rod 57 would have been moved toward the left into the cylinder 53 and the clamping device 62 will hold the piston 57 in such retracted position even though the control stick 31 is returned to normal or vertical position. This will cause the airplane to stay in a right bank even though the student returns the stick to vertical position and in order to level off it is necessary for the student to move the stick slightly toward the left, thereby bringing the stick in contact with the latching member 63 which releases the clamping device 62 and permits the piston 57 to return to normal position under the influence of the counterbalanced springs 27 and 29. Instead of a release latch 63, an electrical contact switch may be employed, such contact switch then operating an electromagnet, solenoid or the like which is capable of releasing the locking device, ratchet, pawl or other member used in holding the piston 57 in partly depressed position. It is to be understood that a similar arrangement of parts is associated with the piston rod extending from booster cylinder 54.

It will be evident, therefore, that the present invention contemplates an airplane equipped with the usual controls for manipulating the control surfaces of an airplane, such controls being mechanically or electrically associated with means for placing the airplane into the various positions about its longitudinal and transverse axes and for turning the airplane about a vertical axis. In accordance with the positions of the control surfaces a student positioned in such an airplane is capable of making turns of 360°, banking, climbing, descending and in performing various maneuvers such as straight and level flying, right and left turns, climbing turns, gliding turns, etc. Moreover, the student pilot is able to visually observe, by reason of the panorama before him, the relative position of the plane with respect to the horizon and therefore can experience the same effects as in actual flight.

Preferably the airplane 5 is provided with an air speed indicator, RPM indicator and compass. An altimeter may be installed, such altimeter being connected to the control stick in such manner as to cause the altimeter dial to show changes in altitude, depending upon the angle of climb (or descent) and the time during which the plane is kept in such climb (or descent). In place of the ordinary gasoline motor, an electric motor may be installed and connected to a feathered propeller. The throttle may be operably associated with the motor driving the propeller so as to necessitate adjustment of the throttle during various maneuvers.

In the event the airplane is provided with an instructor's cockpit, such cockpit may be equipped with a separate set of controls whereby the instructor at his sole option may cause the airplane to suddenly tip a wing, thereby subjecting the student to rough weather conditions such as may be encountered and thereby causing the student to make the necessary adjustments in control surfaces to compensate for the unexpected down draft or the like. The separate controls in the instructor's cockpit may permit the instructor to raise or lower the wing tail and nose of the plane and to turn the plane on its vertical axis to the right or left. These controls may be in addition to and independent of the interlocked or dual control associated with the student's rudder and stick, and such controls may be automatically manipulated (as by a motor driven contact drum) to give the student rough weather conditions when he is operating the plane in solo flight.

It will be evident that the present invention may be used in training pilot fliers on the ground and permits the student to acquaint himself with actual flying conditions without leaving a hangar. The circular enclosure may be approximately 50 feet in diameter and 12 to 15 feet high, permitting the entire assembly, including the plane, to be erected in a hangar or building so that students may continue their work even though the weather does not permit actual flying, and by making the circular enclosure in sections, it may be readily transported. The floor within the enclosure 1 may be concave instead of flat. The device of this invention is of value in eliminating nervousness and fatigue in beginners and inspires confidence in their ability to handle a plane in the air. As a result, many actual flying hours are saved with attendant reduction in the cost of training a pilot.

It is understood that many elements described herein have been shown diagrammatically. The invention is not limited to the specific methods and devices herein described for imparting movement of the airplane in accordance with the movement of the controls by the student pilot, since many other and different pneumatic, hydraulic, electrical and mechanical methods may be employed. For example, the stick may be caused to cooperate with rheostats or other contact switches which energize suitable pumps supplying fluid under pressure to the cylinders 20, 21, 22 and 23, or the control stick 31 may either mechanically or otherwise actuate suitable valves for admitting and discharging pressure from the various cylinders employed in tilting the airplane about its longitudinal and transverse axes. All changes and modifications coming within the scope of the appended claims are embraced thereby.

I claim:

1. In a device for instructing students in flying, the combination of: a substantially circular, stationary enclosure provided on its inner surface with a pictorial representation simulating a panorama visible from a height and including a horizon; an airplane in the center of said enclosure, said airplane being supported by a horizontal rotatable base rotatable through 360° about a vertical axis; a universal joint connected between said base and airplane whereby the airplane may be tilted along transverse and longitudinal axes while turning about a vertical axis; means responsive to the manipulation of the rudder controls by the student pilot in said airplane for moving the rudder of the airplane, motor means for turning said rotatable base and airplane carried thereby, said motor means being energized by movement of the rudder controls out of neutral position, means for maintaining said motor means in energized condition when the rudder controls are returned to neutral, and means for deenergizing the motor when the rudder controls are moved slightly in the opposite direction whereby a student may be taught coordination and response under actual reproduced flight conditions without leaving the ground.

2. In a device for instructing students in flying, the combination of: a substantially circular, stationary enclosure provided on its inner surface with a pictorial representation simulating a panorama visible from a height and including a horizon; an airplane in the center of said enclosure, said airplane being supported by a base rotatable through 360° in a horizontal plane and around a vertical axis; a universal joint connected between said base and airplane whereby the airplane may be tilted about transverse and longitudinal axes while turning about the vertical axis; a control stick adapted for operation by the student pilot in the airplane, said control stick being adapted to manipulate ailerons, means associated with said stick for tilting the airplane when the ailerons are moved into and out-of-neutral position, means for maintaining the airplane in a tilted position when the control stick is returned to neutral, and means operably associated with the control stick for returning the ailerons and airplane to level position when the control stick is moved slightly in the opposite direction.

3. In an airplane for instructing students in flying, such airplane including a seat for a student pilot, said airplane being supported by a base rotatable through 360° in a horizontal plane and around a vertical axis, and a universal joint connection between said base and airplane; a control stick adapted for operation by the student pilot in the airplane, said control stick being adapted to manipulate ailerons, means associated with said stick for tilting the airplane when the ailerons are moved into out-of-neutral position, means for maintaining the airplane in a tilted position when the control stick is returned to neutral, and means operably associated with the control stick for returning the ailerons and airplane to level position when the control stick is moved slightly in the opposite direction.

4. In an airplane for instructing students in flying, such airplane including a seat for a student pilot: an airplane supported by a base rotatable through 360° in a horizontal plane and around a vertical axis, and a universal joint connection between said base and airplane; means responsive to the manipulation of rudder controls within the airplane for moving the rudder of the airplane; motor means for turning said rotatable base and airplane carried thereby, said motor means being energized by movement of the rudder controls out of neutral position; means for maintaining said motor means in energized condition when the rudder controls are returned to neutral; and means for de-energizing the motor when the rudder controls are moved slightly in the opposite direction, whereby a student may be taught coordination and response under reproduced flight conditions without leaving the ground.

ALAN EDWARDS.